US007886158B2

(12) United States Patent
Osaki

(10) Patent No.: US 7,886,158 B2
(45) Date of Patent: Feb. 8, 2011

(54) SYSTEM AND METHOD FOR REMOTE COPY OF ENCRYPTED DATA

(75) Inventor: Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 1553 days.

(21) Appl. No.: 11/220,690

(22) Filed: Sep. 8, 2005

(65) Prior Publication Data

US 2007/0055894 A1    Mar. 8, 2007

(51) Int. Cl.
  G06F 11/30    (2006.01)
  G06F 12/14    (2006.01)
(52) U.S. Cl. .................. 713/193; 327/545; 327/546; 711/163
(58) Field of Classification Search .................. 713/193
  See application file for complete search history.

(56) References Cited

U.S. PATENT DOCUMENTS

| 5,235,641 | A |   | 8/1993  | Nozawa et al.    |         |
|-----------|---|---|---------|------------------|---------|
| 5,499,293 | A | * | 3/1996  | Behram et al.    | 705/76  |
| 5,513,262 | A | * | 4/1996  | van Rumpt et al. | 380/29  |
| 5,677,952 | A |   | 10/1997 | Blakley, III et al. |      |
| 5,931,947 | A | * | 8/1999  | Burns et al.     | 726/4   |
| 5,940,507 | A |   | 8/1999  | Cane et al.      |         |
| 6,834,348 | B1 | * | 12/2004 | Tagawa et al.   | 713/193 |
| 6,975,730 | B1 | * | 12/2005 | Kuroiwa et al.  | 380/284 |
| 7,091,887 | B2 | * | 8/2006  | Nagai et al.    | 341/58  |
| 7,162,647 | B2 | * | 1/2007  | Osaki           | 713/193 |
| 7,240,220 | B2 | * | 7/2007  | Osaki           | 713/193 |
| 7,383,462 | B2 | * | 6/2008  | Osaki et al.    | 714/2   |
| 7,664,261 | B2 | * | 2/2010  | Lee et al.      | 380/200 |
| 7,689,837 | B2 | * | 3/2010  | Taguchi et al.  | 713/193 |
| 2009/0109925 | A1 | * | 4/2009 | Nakamura et al. | 370/331 |

FOREIGN PATENT DOCUMENTS

WO    WO 02/093314    11/2002

* cited by examiner

*Primary Examiner*—Farid Homayounmehr
(74) *Attorney, Agent, or Firm*—Mattingly & Malur, P.C.

(57) ABSTRACT

A system and method for remote copy of encrypted data where a primary storage system receives data, encrypts the data with a first cryptographic method, and stores the encrypted data. A secondary storage system connected to the primary storage system receives and stores a remote copy of the encrypted data. When a block of the stored encrypted data is converted using a second cryptographic method, the converted block and a pointer containing an address at which the conversion has finished is transferred to the second storage system and stored. The pointer is incremented for each block converted. A backup copy of the first cryptographic method and the second cryptographic method are stored at a backup system remote from the primary storage system. If the primary system fails, the backup system can decrypt the data using the first cryptographic method or the second cryptographic method based on the pointer.

8 Claims, 14 Drawing Sheets

SYSTEM AND METHOD FOR REMOTE COPY OF ENCRYPTED DATA

BACKGROUND

1. Field of the Invention

This invention relates to storage systems, and more specifically to remote copy of encrypted data from one storage system to another storage system.

2. Description of the Related Art

Encryption of data is commonly used to add some security to the data and to the transmission of the data. Further, copies of data are sometimes stored remotely at another storage system or storage device to serve as a backup should a primary storage system or storage device fail. However, problems arise should a storage system fail while in the process of encrypting the data. In this situation, it is not clear what data has been encrypted and which has not. Moreover, if multiple encryption techniques have been used, during a failure, it is not clear which data has been encrypted with which encryption technique and, therefore, which technique should be used to decrypt the data.

Information on DES (Data Encryption Standard) can be found on the Internet at www.itl.nist.gov/fipspubs/fip46-2.htm, and information on AES (Advanced Encryption Standard) exists at csrc.nist.gov/CryptoToolkit/aes/. Moreover, existing inventions in areas related to data encryption and data backup include: WO2002093314 A2 that discloses an encryption based security system for network storage, which provides an encryption based security system for network storage that separates the ability to access storage from the ability to access the stored data; U.S. Pat. No. 5,677,952 that discloses a method to protect information on a computer storage device, with which data in disks is encrypted and decrypted using keys derived from a password entered; U.S. Pat. No. 5,940,507 that discloses an information processing system providing archive/backup support with privacy assurances by encrypting data stored thereby; and U.S. Pat. No. 5,235,641 that discloses a file cryptographic method and file cryptographic system, which encrypts and decrypts data in storage systems. However, none of these provide solutions to the above-mentioned problems.

Therefore, there is a need for providing remote copy of encrypted data from one storage system to another storage system where if there is a failure at the first storage system during the encryption of data and remote copying of the data, the second storage system can decrypt the data using the appropriate method.

SUMMARY OF THE INVENTION

A system and method for remote copy of encrypted data where a primary storage system receives data, encrypts the data with a first cryptographic method, and stores the encrypted data. A secondary storage system connected to the primary storage system receives and stores a remote copy of the encrypted data. When a block of the stored encrypted data at the primary storage system is converted using a second cryptographic method, the converted block and a pointer containing an address at which the conversion has finished is transferred to the second storage system and stored. The pointer is incremented for each block converted. A backup copy of the first cryptographic method and the second cryptographic method are stored at a backup system remote from the primary storage system. If the primary system fails, the backup system can decrypt the data using the first cryptographic method or the second cryptographic method based on the pointer.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
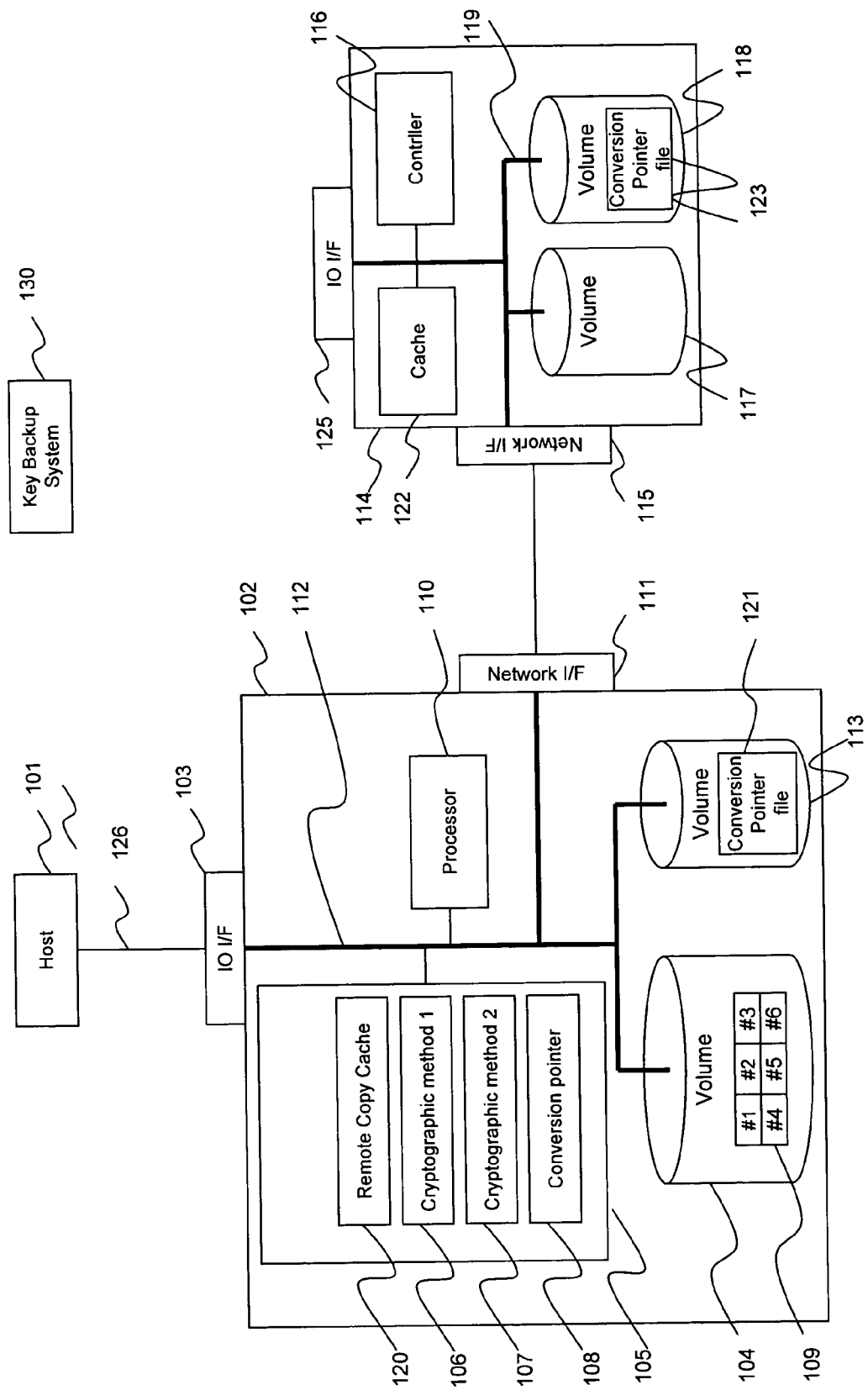
FIG. 1 is a diagram of a primary storage system according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

According to embodiments of the present invention, the data on a volume of a primary storage system is encrypted by the controller of the primary storage system with a certain cryptographic method such as, for example, using encryption/decryption keys and an encryption/decryption algorithm, and the volume is remotely copied to the volume of a secondary storage system. The cryptographic method is backed up to an entity other than the primary storage system, just in case the primary storage system should fail. If the primary storage system fails, the data on the secondary storage system can be recovered by retrieving and using the cryptographic method that was backed up.

The cryptographic method applied to the data on the primary storage system may be in the process of being changed with a new cryptographic method. Thus, the data is decrypted with the old cryptographic method and encrypted with the new cryptographic method. If the primary system fails during this data conversion, the data on the secondary storage system may be a mixture of that encrypted with old and new cryptographic method. Embodiments of the present invention overcome this situation by making known which cryptographic method to use to decrypt the data by backing up the new encryption method to, for example, a backup system other than the primary storage system such as the secondary storage system or a key backup server.

When a block of the data is converted from the old encryption method to the new one, i.e. decrypted with the old encryption method and encrypted with new encryption method, the pointer or address of the block (border pointer hereafter) is transmitted to the secondary storage system at the same time when the block is transferred to the secondary storage system. The pointer may be stored at a certain memory of the secondary storage system. If the primary storage system fails, the border pointer is read by the backup system. The backup system can decrypt the data using the new cryptographic method if the pointer to data is equal to or smaller than the border pointer, the data is decrypted with the new cryptographic method, otherwise the data is decrypted with the old cryptographic method.

FIG. 1 shows a diagram of a primary storage system according to an example embodiment of the present invention. The system may include a host device 101, a first storage system 102, a second storage system 114, and a key backup system 130. The first storage system 102 may include an input/output (I/O) interface 103, a processor 110, one or more volumes 104, 113, one or more memories 105 that may contain areas for a remote copy cache 120, a first cryptographic method 106, a second cryptographic method 107, and a conversion pointer 108, and a network interface 111 for interfacing to the second storage system 114. An internal bus 112 at the first storage system interconnects the input/output (I/O) interface 103, the processor 110, the one or more volumes 104, 113, the one or more memories 105, and the network interface 111. The second storage system 114 may include an I/O interface 125 for interfacing to a host device, a cache memory 122, a controller 116, a network interface 115 for interfacing to the first storage system 102, and one or more volumes 117, 118. An internal bus 119 at the second storage system 114 interconnects the I/O interface 125, the cache memory 122, the controller 116, the network interface 115, and the one or more volumes 117, 118.

The host 101 may be connected through a network 126 to the I/O interface 103 at the first storage system 102. I/O operations from the host 101 pass through the I/O interface (I/F) 103 and then are processed by the processor 110 using the memory 105, and finally reach the storage disk 104, which may be RAID or just a bunch of disks (JBOD).

For illustration purposes, it will be assumed that incoming data from the host 101 is received and then encrypted with a cryptographic method 1. A cryptographic method is a set of information which contains encryption/decryption key(s) and/or algorithm and the information which indicates a set of data which is applied with the key(s) and/or algorithm. In this example embodiment, cryptographic method 1 and 2 are loaded and stored in two memory areas 106 and 107, respectively.

Before the data is stored, the data is encrypted. When the host 101 issues a write request to write plain data on a certain position of the disk volume 104, the processor 110 encrypts the block of plain data, (typically 512 byte length), using cryptographic method 1, and then writes to a position on the disk 104. When the host 101 issues a read request to read the data in the disk 104, the processor 110 retrieves the data from the disk 104, decrypts the data using cryptographic method 1, and then returns the decrypted data to host 101. The cryptographic method also contains information describing the set of data or volumes to which the method has been applied. According to embodiments of the present invention, cryptographic methods may be backed up to the key backup system 130. Cryptographic methods are transferred to the key backup system via a network or a removable storage device such as a floppy disk, a USB memory, etc.

Figure 2:
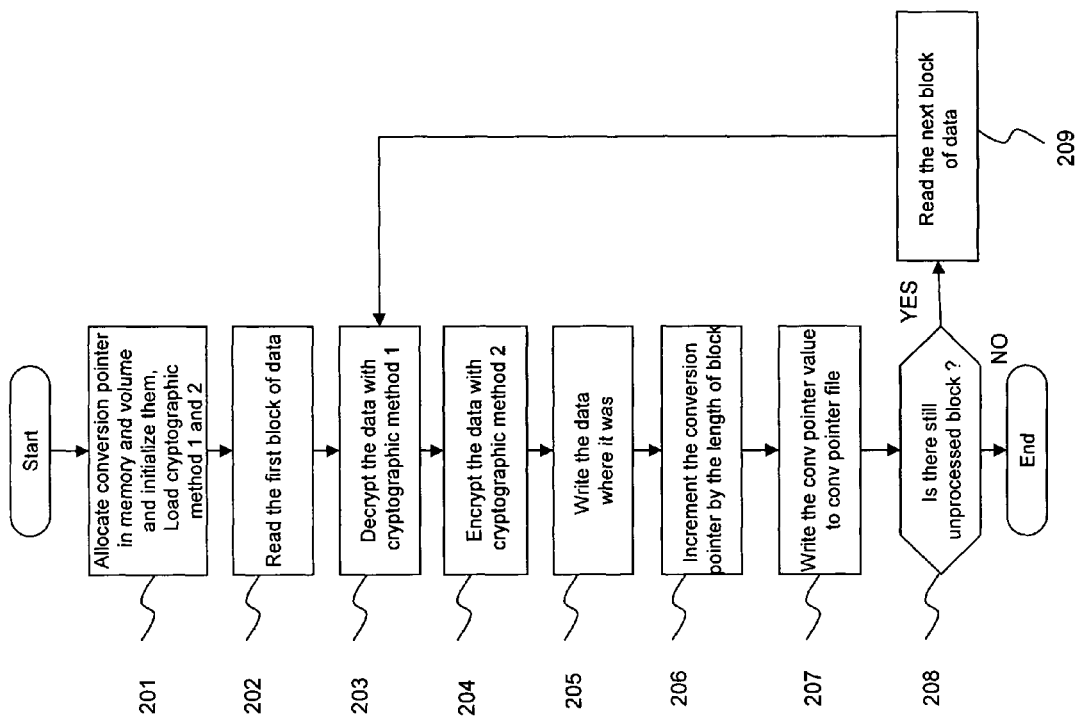
FIG. 2 is a flowchart of a process to convert data encrypted with a first cryptographic method into data encrypted with a second cryptographic method according to an example embodiment of the present invention.

FIG. 2 shows a flowchart of a process to convert data encrypted with a first cryptographic method into data encrypted with a second cryptographic method according to an example embodiment of the present invention. The processor 110 loads the cryptographic methods 1 and 2 and allocates the conversion pointer 108 in the memory 105 and creates a conversion pointer file 121 on the volume 113 for this conversion process, and then initializes the conversion pointer 108 and the conversion pointer file 121 to indicate zero (201). The conversion pointer file 121 may be formatted so that it may be read by the key backup system 130. For example, the volume may be formatted to NTFS and the conversion pointer file 131 contains binary data which stores the value of the conversion pointer 108. Although the cryptographic methods 1 and 2 have been shown here as being stored in memory at a first storage system 102, the cryptographic methods can be stored anywhere, e.g., in a non-volatile memory within the storage system 102 or outside the storage system 102, until they are loaded on the memory 106, 107, etc.

The conversion pointer 108 contains the position or the address in the disk volume 104 at which the conversion from the cryptographic method 1 to the cryptographic method 2 has finished. The processor 110 reads the first block of data in the disk 104 (202 for this first block, 209 for the succeeding blocks) and decrypts the data with cryptographic method 1 (203). Then the processor 110 encrypts the data with cryptographic method 2 (204) and writes the encrypted data where the original data was (205). The conversion pointer 108 is then incremented by one block (206). The value of the conversion pointer 108 is written in the conversion pointer file 121 (207). This process is then repeated until all data has been processed (208, 209). After the entire conversion process completes, the cryptographic method 2 saves information to indicate that the data in the volume 104 has been encrypted using cryptographic method 2.

Figure 3:
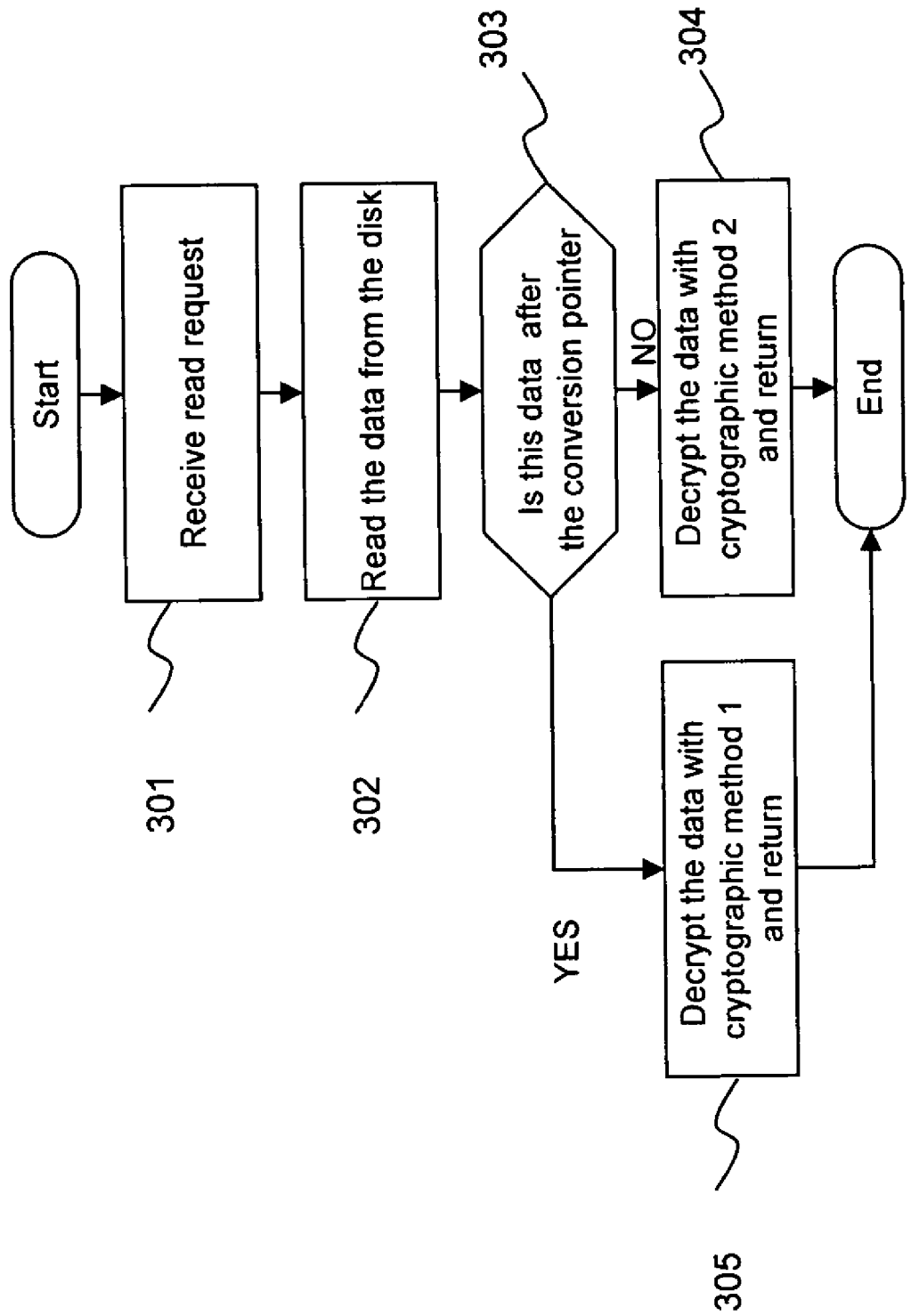
FIG. 3 is a flowchart of a read process according to an example embodiment of the present invention.

FIG. 3 shows a flowchart of a read process according to an example embodiment of the present invention. The process may be performed during the conversion process shown in FIG. 2. The storage system 102 receives a request from the host 101 to read a certain block of data in the disk 104 (301). The processor 110 then reads the data from the disk 104 (302) and determines if the data has been already converted based on whether the address of the block is located before or after the conversion pointer 108 (303). If the block is located at or before the conversion pointer 108, the data in the read block is decrypted using cryptographic method 2 and the decrypted data is returned to the host 101 (304). If the block is located after the conversion pointer 108, the data is decrypted with cryptographic method 1 and then the decrypted data is returned to the host 101 (305).

Figure 4:
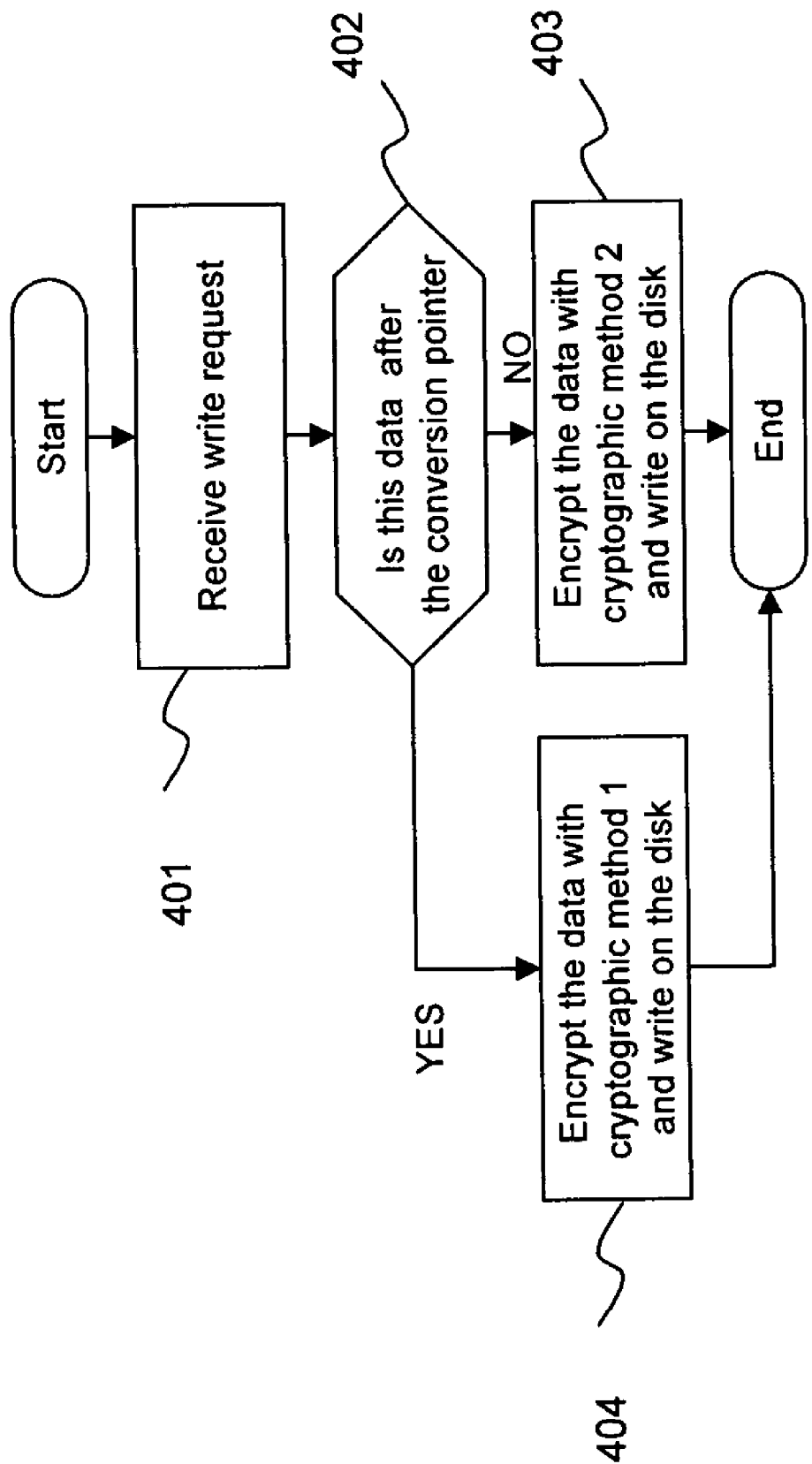
FIG. 4 is a flowchart of a write process according to an example embodiment of the present invention.

FIG. 4 shows a flowchart of a write process according to an example embodiment of the present invention. The process may be performed during the conversion process shown in FIG. 2. The storage system 102 receives a request from the host 101 to write a certain block of data in the disk 104 (401). The processor 110 then determines if the data has been already converted based on whether the address of the block is located before or after the conversion pointer 108 (402). If the block is located at or before the conversion pointer 108, the data is encrypted with cryptographic method 2 and the encrypted data is written in the disk 104 (403). If the block is located after the conversion pointer 108, the data is encrypted with cryptographic method 1 and the encrypted data is then written in the disk 104 (404).

The operation of remote copy of encrypted data according to the present invention will now be discussed. The volume 104 of the primary storage system 102 may be configured to be copied to the volume 117 of the secondary storage system 114. Also the volume 113 is configured to be copied to the volume 118. Volumes 104 and 113 are configured as the same consistency group. When a block of data on the volume 104 is updated due to an updated host I/O or cryptographic method conversion (as was described in FIG. 2), the block may be copied to a memory (e.g., remote copy cache 120 hereafter) with some other information.

Figure 5:
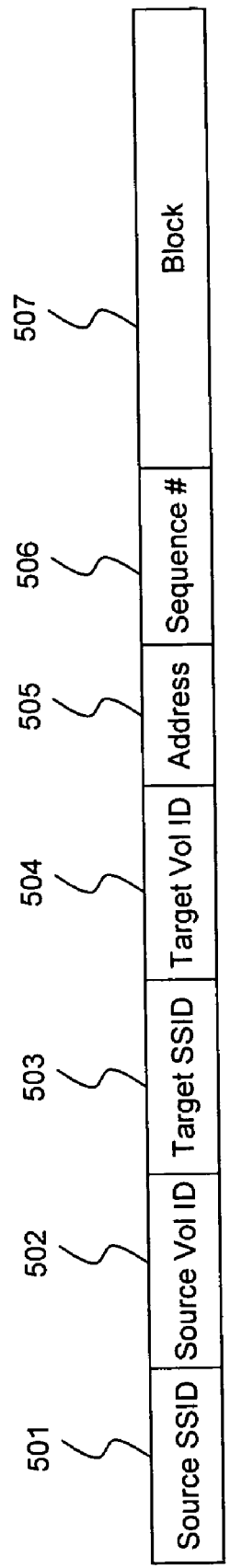
FIG. 5 is a diagram of a record of information that may copied to memory with a data block according to an example embodiment of the present invention.

FIG. 5 shows a diagram of a record of information that may copied to memory with a data block according to an example embodiment of the present invention. The record may contain information such as, for example, source storage system ID 501 (in this case, the primary storage system 102), source volume ID 502 (volume 104), target storage system ID 503 (volume 114), target volume ID (117), address 505 (described as the conversion pointer 108), sequence number 506 and the block of the data 507.

The sequence number plays a role of maintaining consistency of data by ensuring the order of write access. The sequence numbers are assigned to all updated blocks across the volumes in the same consistency group. If the block A is updated earlier than the block B and both block A and B belong to the volume(s) of the same consistency group, the sequence number of block A is smaller than that of B. When the conversion pointer file 121 is updated, the block containing the file is copied to the remote copy cache 120 with the source volume ID 502, the address of the block 505 and the sequence number 506, etc.

In one embodiment of the present invention, the sequence number of the block updated due to cryptography conversion is assigned larger than the sequence number of the conversion pointer of the corresponding converted block by one (i.e. (sequence # of conversion pointer of the block)=(sequence # of converted block)−1).

The processor 110 picks up a record from the remote copy cache 120 and the record is sent to the target volume in the secondary storage system 114. If an acknowledgement is received from the secondary storage system 114, the record may be deleted from the remote copy cache unless the record is also used for another purpose. The remote copy cache can be a volatile memory or a non-volatile memory such as a magnetic disk.

When the secondary storage system 114 receives a record, it stores the record in the cache 122. The controller 116 checks the cache 122 and finds out the maximum sequence number which does not have any smaller number which has not reached the secondary storage system. Then the blocks with a sequence number of equal to or smaller than the maximum sequence number are written on the volume at the specified address of the target volume ID.

If the primary storage system 102 fails, the key backup system 130 reads the encrypted volume 117, and decrypts the data using the cryptographic method 1 and 2 which have been backed up from the primary storage system 102. When the key backup system 130 determines which cryptographic method to use to decrypt data on the volume 117, there are two possible scenarios.

In the first scenario only the conversion pointer data of a certain block has been written to the volume and the associated converted block has not reached the secondary storage system. This exists when the sequence number of the conversion pointer is smaller than that of the associated converted block by one. The second scenario is that both the conversion pointer and the associated converted block have reached the secondary storage system 114 and are written on each volume. So it may be uncertain if the block at the address specified by the conversion pointer is encrypted using cryptographic method 1 or cryptographic method 2. However in most cases, applications which use the data understand which cryptographic method is used when they read decrypted data with those cryptographic methods. In these cases, an application which uses the encrypted data may need to perform a trial-and-error process, i.e., at first the application requests the backup system to decrypt the uncertain record with cryptographic method 1, and then reads the decrypted data to determine if the decrypted data complies with the designated data format. If it does not, then the application requests the backup system to decrypt the data with cryptographic method 2. The decrypted data should comply with the designated data format. The block whose address is smaller than the conversion pointer can be decrypted with the cryptographic method 1, and the block whose address is larger than the conversion pointer can be decrypted with the cryptographic method 2.

Figure 6:
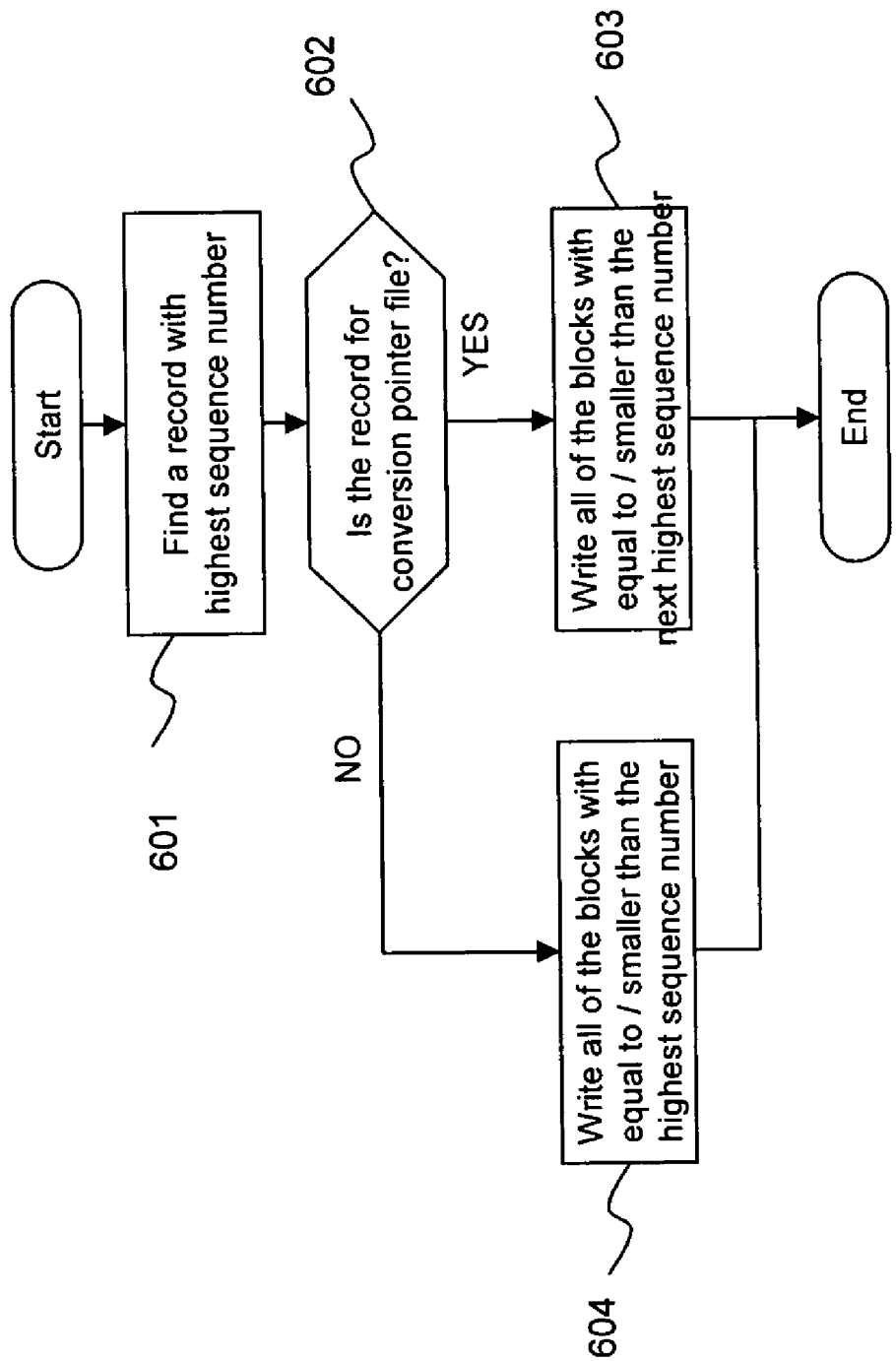
FIG. 6 is a flowchart of a block write process based on sequence number according to an example embodiment of the present invention.

If the controller 116 includes the capability to perform the process described in FIG. 6, the controller 116 can determine that the block at the address specified by the conversion pointer is encrypted using the cryptographic method 2 without such a trial-and-error process.

FIG. 6 shows a flowchart of a block write process based on sequence number according to an example embodiment of the present invention. In this example embodiment, the block at the address specified by the conversion pointer is encrypted using the cryptographic method 2. The controller 116 finds the record with the highest sequence number, which does not have any smaller number which has not reached the secondary storage system (601). The controller 116 then determines if the record is for the conversion pointer file 123 (602). If the record is for the conversion pointer file 123, the controller 116 then writes all of the blocks with equal to or smaller than the next highest sequence number (603). If the record is not for the conversion pointer file 123, the controller 116 then writes all of the blocks with equal to or smaller than the next highest sequence number (604).

If the record has an additional field (as will be described following), the field can have information to indicate that the record came from the conversion pointer file 113. If the record does not have such a field, the controller can determine if the record is for the conversion pointer file 123 by the configuration such as by inputting the information manually.

Figure 7:
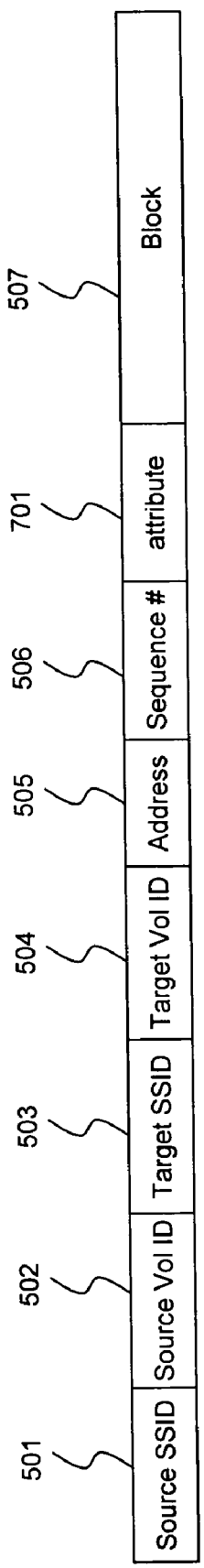
FIG. 7 is a diagram of a record of information that may be copied to memory with a data block that includes cryptographic information according to an example embodiment of the present invention.

FIG. 7 shows a diagram of a record of information that may be copied to memory with a data block that includes cryptographic information according to an example embodiment of the present invention. The record may contain information such as, for example, source storage system ID 501, source volume ID 502, target storage system ID 503, target volume ID, address 505, sequence number 506, the block of the data 507, as well as an attribute field 701 that contains information regarding the cryptographic method. When the processor 110 copies the converted block to the remote copy cache 120, the processor sets the attribute field 701 as "cryptographic method 2". When the processor 110 copies the block updated due to a host I/O to the remote copy cache 120, the processor sets the attribute field 701 as "cryptographic method 1". These records are sent to the secondary storage system 114.

In this embodiment of the present invention, the processor 110 does not write the conversion pointer 108 to the conversion pointer file 121. Both the conversion pointer file 121 and volume 113 are not used. When the secondary storage system 114 receives the record, it retrieves the address and writes the address information on the volume 118 if the attribute field is "cryptographic method 2". When the primary storage system 102 fails and the key backup system 130 decrypts the data on the volume 117, the key backup system 130 decrypts data with cryptographic method 2 if the address is equal to or smaller than the address written on the volume 118, with cryptographic method 1 if larger than the address. In the explanation above, the address information is assumed to be written on the volume 118, however, it is not necessarily written on a volume that consists of magnetic disks. The address information may be written any form of memory as long as the address information can be retrieved when needed. When the attribute filed is stored in the storage system for each block or a set of blocks, the controller 117 can use this information when choosing the cryptographic method and the volume 118 does not need to be used.

In the above embodiments, the key backup system 130 exists outside of the secondary storage system 114. However, in another embodiment of the present invention, the secondary storage system 114 may also serve as the key backup system 130 by storing the cryptographic methods, and decrypting the encrypted data.

In another embodiment of the present invention, a different cryptographic method may be used when data is transferred. A block of data may be encrypted with a first cryptographic method 1 before it is written on the volume. When the data is copied to the secondary storage system 114, the data is transferred in clear or may be encrypted by a third cryptographic method 3. When the data reaches the secondary storage system, the data is decrypted with cryptographic method 3 if it is encrypted, and then written on the designated volume after being encrypted with cryptographic method 2. The cryptographic method 3 may typically be determined through negotiation between the primary storage system 102 and the secondary storage system 114, such as for example, SSL, TLS, etc.

Figure 8:
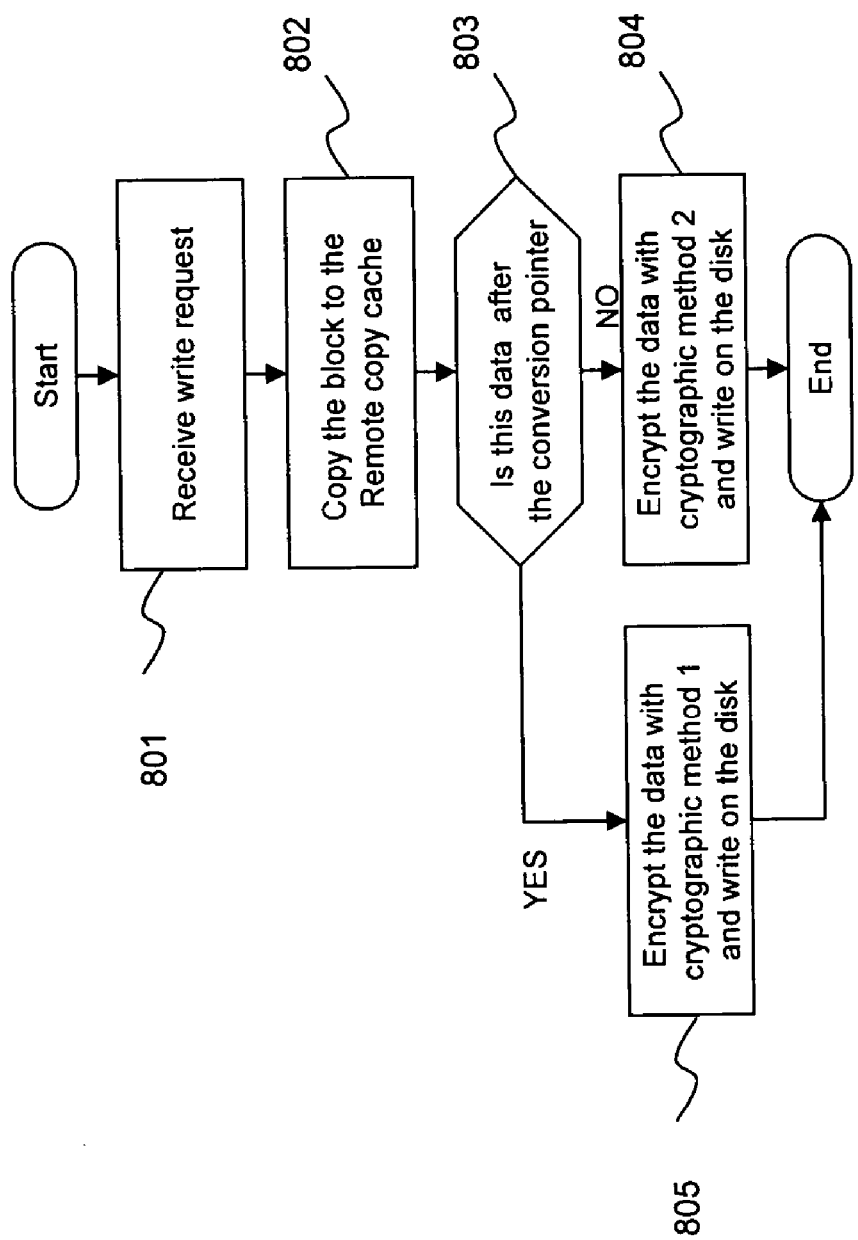
FIG. 8 is a flowchart of a process illustrating how host I/O is put in the remote copy cache, according to an example embodiment of the present invention.

FIG. 8 shows a flowchart of a process illustrating how host I/O is put in the remote copy cache, according to an example embodiment of the present invention. The storage system receives a request from the host to write a certain block of data in the disk (801). The block is then copied to the remote copy cache 120 (802). The processor then determines if the data has been already converted based on whether the address of the block is located before or after the conversion pointer (803). If the block is located at or before the conversion pointer, the data is encrypted with cryptographic method 2 and the encrypted data is written in the disk (804). If the block is located after the conversion pointer, the data is encrypted with cryptographic method 1 and the encrypted data is then written in the disk (805).

Figure 9:
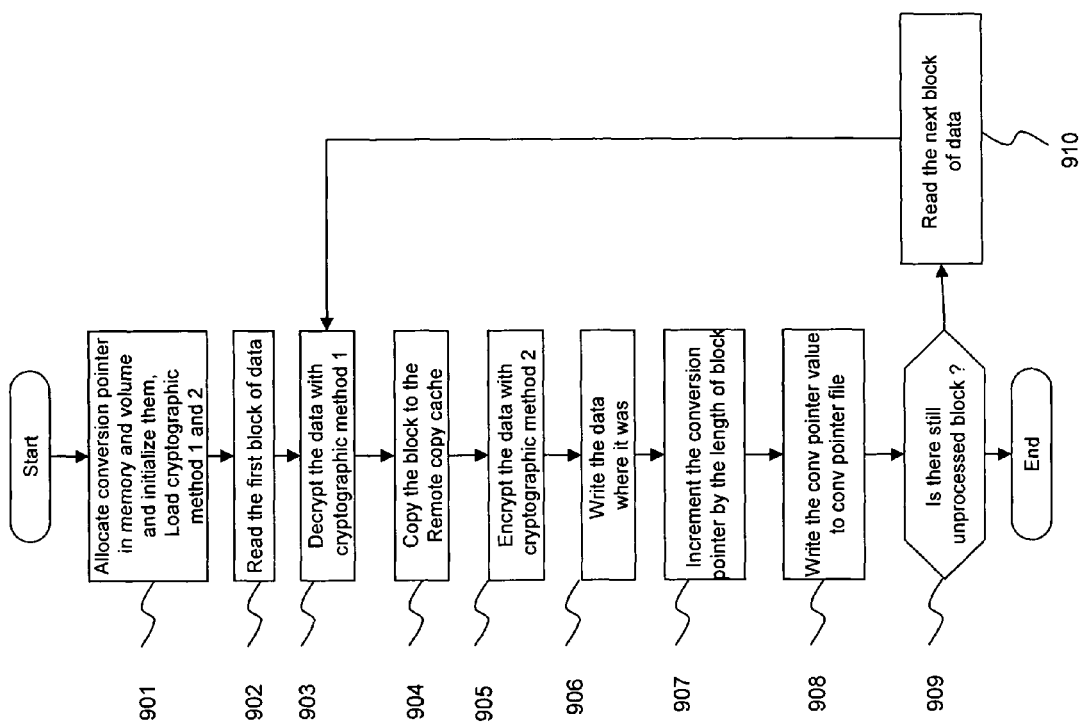
FIG. 9 is a flowchart of a process illustrating how the converted block is put in the remote copy cache, according to an example embodiment of the present invention.

FIG. 9 shows a flowchart of a process illustrating how the converted block is put in the remote copy cache, according to an example embodiment of the present invention. The processor 110 loads the cryptographic methods 1 and 2 and allocates the conversion pointer 108 in the memory 105 and creates a conversion pointer file 121 on the volume 113 for this conversion process, and then initializes the conversion pointer 108 and the conversion pointer file 121 to indicate zero (901). The conversion pointer file 121 may be formatted so that it may be read by the key backup system 130. The processor 110 reads the first block of data in the disk 104 (902 for this first block, 910 for the succeeding blocks) and decrypts the data with cryptographic method 1 (903). The processor 110 copies the block to the remote copy cache (904). Then the processor 110 encrypts the data with cryptographic method 2 (905) and writes the encrypted data where the original data was (906). The conversion pointer 108 is then incremented by one block (907). The value of the conversion pointer 108 is written in the conversion pointer file 121 (908). This process is then repeated until all data has been processed (909, 910).

Figure 10:
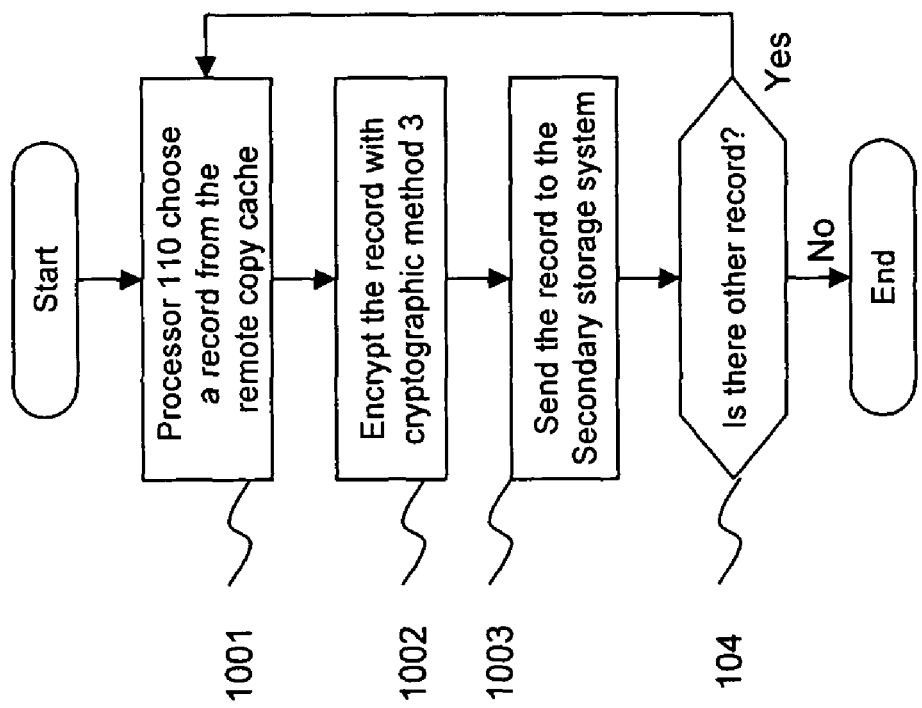
FIG. 10 is a flowchart of a process illustrating how the record is sent to the secondary storage system, according to an example embodiment of the present invention.

FIG. 10 shows a flowchart of a process illustrating how the record is sent to the secondary storage system, according to an example embodiment of the present invention. The processor 110 chooses a record from the remote copy cache 120 (1001). The processor 110 encrypts the record with encryption method 3 (1002). The encrypted record is then sent from the primary storage system 102 to the secondary storage system 114 (1003). This process is repeated until all records are processed (1004).

Figure 11:
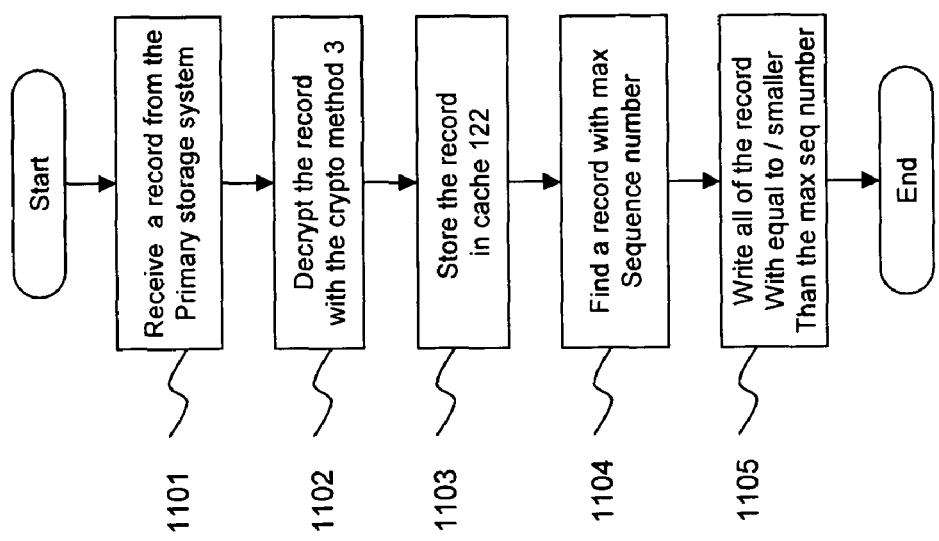
FIG. 11 is a flowchart of a process illustrating how the secondary storage system receives the block and writes on the volume, according to an example embodiment of the present invention.

FIG. 11 shows a flowchart of a process illustrating how the secondary storage system receives the block and writes on the volume, according to an example embodiment of the present invention. A record is received at the secondary storage system 114 from the primary storage system 102 (1101). The received record is decrypted at the secondary storage system 114 using cryptographic method 3 (1102), and then stored in the cache 122 at the secondary storage system 114 (1103). The records are searched to determine the record with the highest sequence number (1104). All records with a sequence number equal to or smaller than the highest sequence number are then written to the disk at the secondary storage system 114 (1105).

Figure 12:
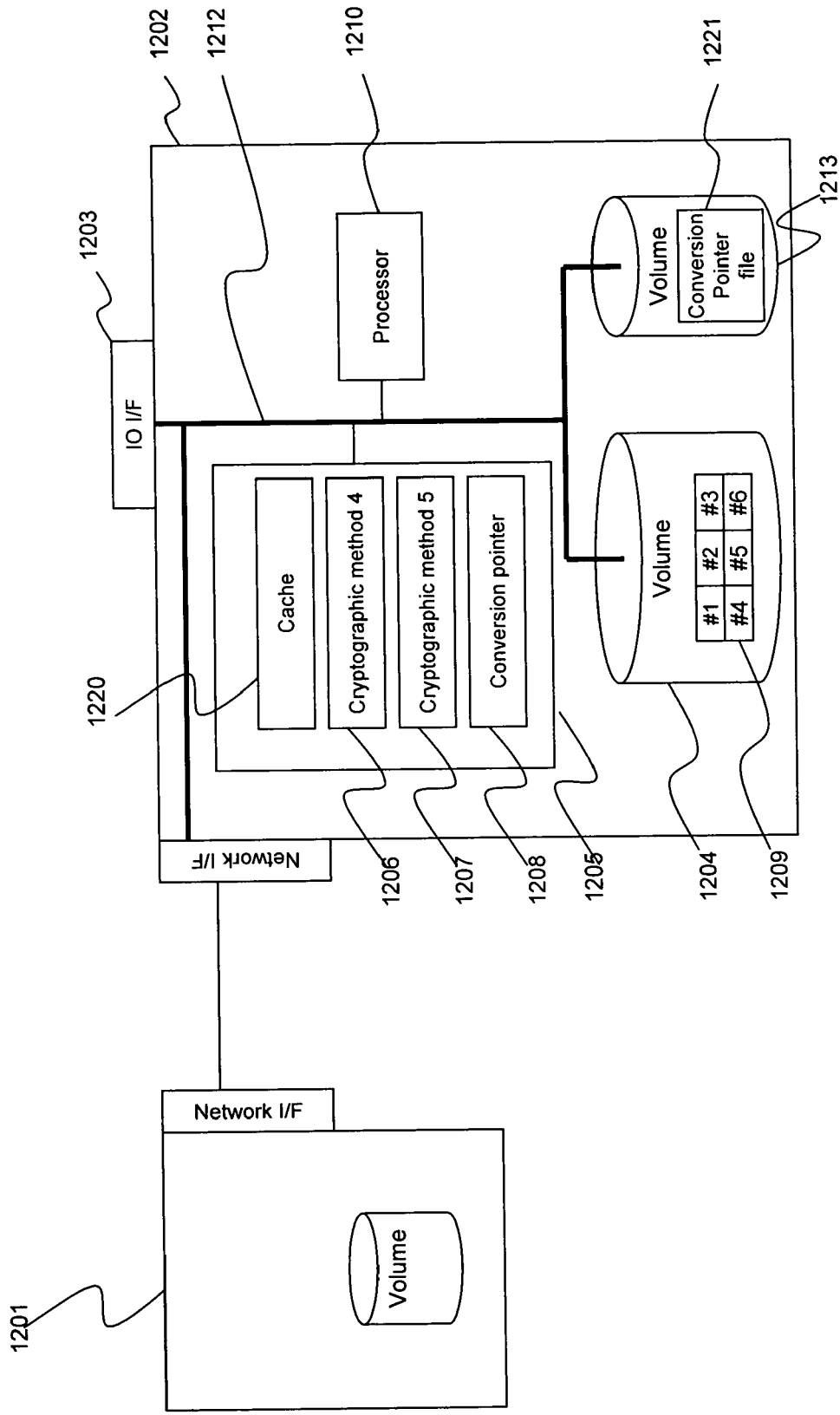
FIG. 12 is a diagram of a system where the secondary storage system has the capability to encrypt/decrypt data with the controller and change cryptographic methods, according to an example embodiment of the present invention.

FIG. 12 shows a diagram of a system where the secondary storage system has the capability to encrypt/decrypt data with the controller and change cryptographic methods, according to an example embodiment of the present invention. The system may include a primary storage system 1201 and a secondary storage system 1202. The secondary storage system 1202 may include an I/O interface 1203 that interfaces the secondary storage system 1202 to a host device, a processor 1210, one or more volumes 1204, 1213, one or more memories 1205 that may contain areas for a cache 1220, a cryptographic method 4, 1206, a cryptographic method 5, 1207, and a conversion pointer 1208, and a network interface 1211 for interfacing to the primary storage system 1201. An internal bus 1212 at the secondary storage system interconnects the input/output (I/O) interface 1203, the processor 1210, the one or more volumes 1204, 1213, the one or more memories 1205, and the network interface 1211.

In this example embodiment, the secondary storage system 1202 can accept data updates due to a remote copy. Data is copied from the primary storage system 1201 to the secondary storage system 1202. The configuration of the secondary storage system 1202 is similar to the primary storage system 102 discussed previously regarding FIG. 1 except the cache 1220 is used to receive records from the primary storage system 1201.

Figure 13:
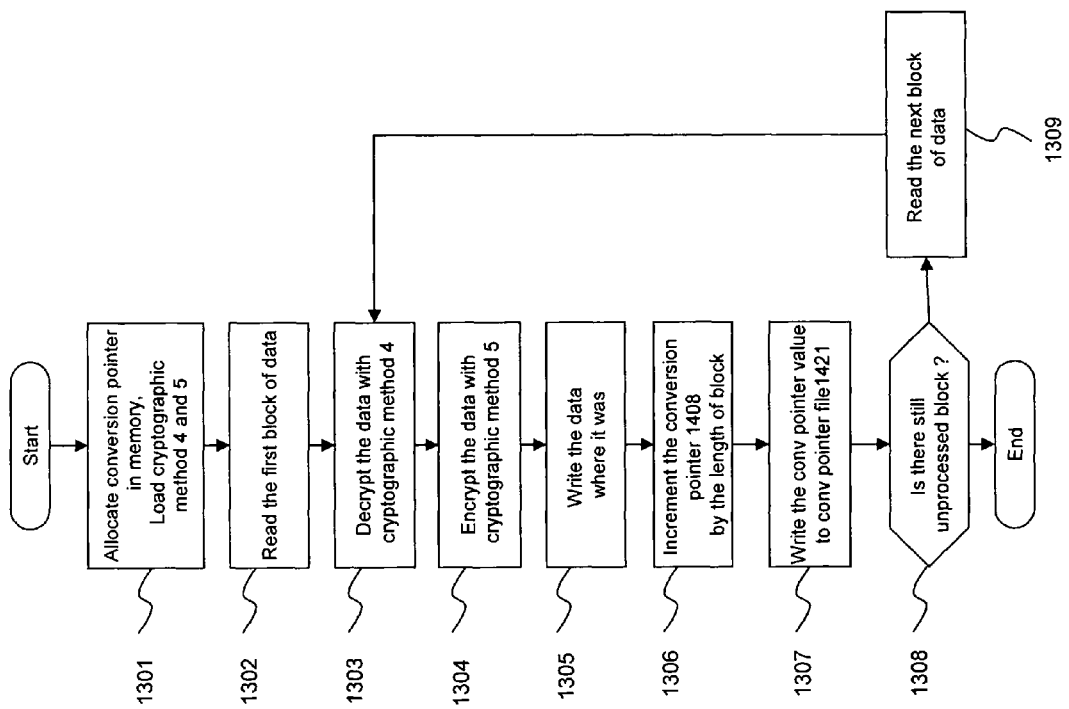
FIG. 13 is a flowchart of a process for converting the data from a fourth cryptographic method to a fifth cryptographic method according to an example embodiment of the present invention.

FIG. 13 shows a flowchart of a process for converting the data from a fourth cryptographic method to a fifth cryptographic method, according to an example embodiment of the present invention. The processor 1210 loads the cryptographic methods 4 and 5 and allocates the conversion pointer 1208 in the memory 1205 and creates a conversion pointer file 1221 on the volume 1213 for this conversion process, and then initializes the conversion pointer 1208 and the conversion pointer file 1221 to indicate zero (1301).

The conversion pointer 1208 contains the position or the address in the disk volume 1204 at which the conversion from the cryptographic method 4 to the cryptographic method 4 has finished. The processor 1210 reads the first block of data in the disk 1204 (1302 for this first block, 1309 for the succeeding blocks) and decrypts the data with cryptographic method 4 (1303). Then the processor 1210 encrypts the data with cryptographic method 5 (1304) and writes the encrypted data where the original data was (1305). The conversion pointer 1208 is then incremented by one block (1306). The value of the conversion pointer 1208 is written in the conversion pointer file 1221 (1307). This process is then repeated until all data has been processed (1308, 1309). After the entire conversion process completes, the cryptographic method 5 saves information to indicate that the data in the volume 1204 has been encrypted using cryptographic method 5. In this embodiment, for the first time, the data in the volume may not be encrypted and cryptographic method 4 actually may not contain keys nor algorithm information.

Figure 14:
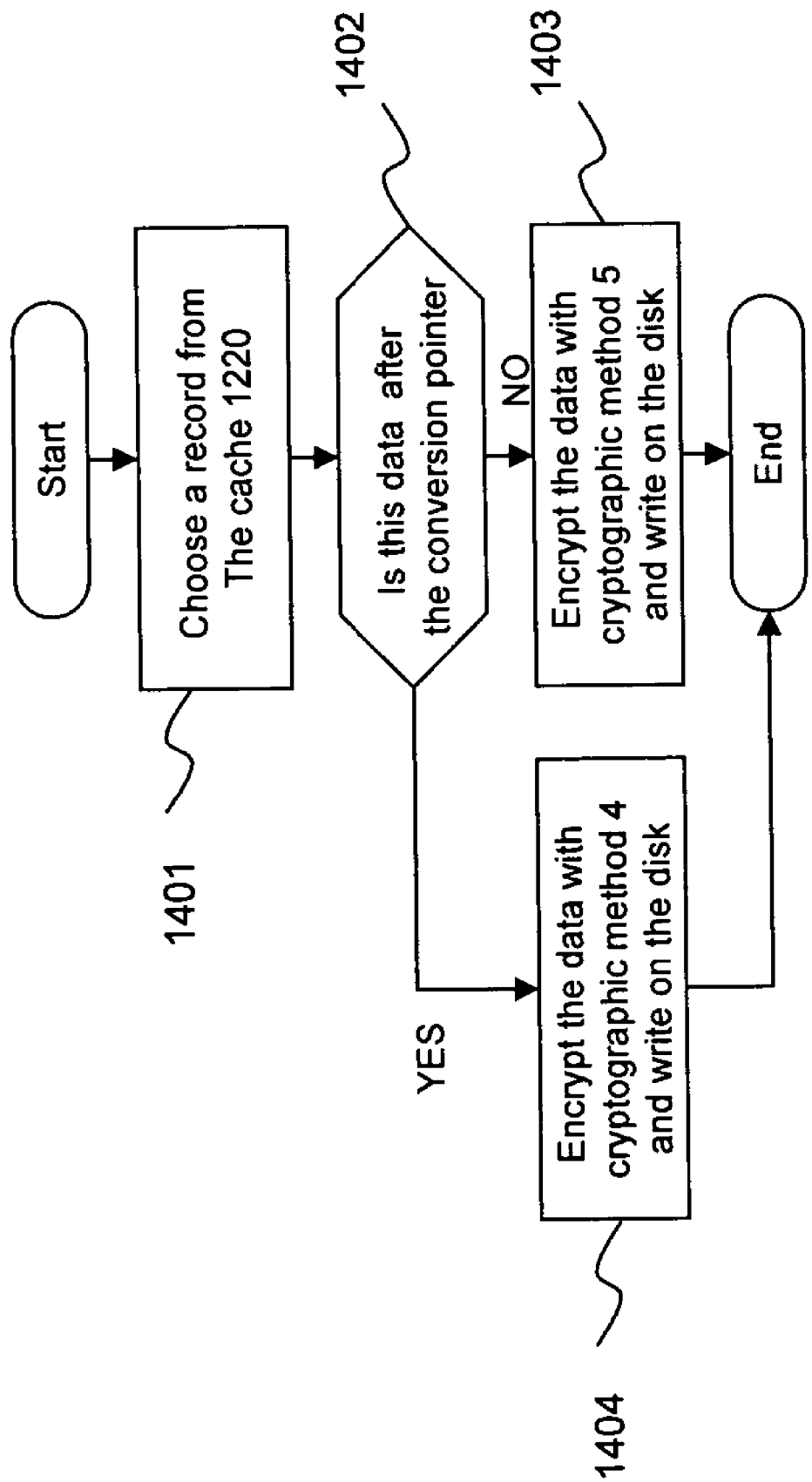
FIG. 14 is a flowchart of a process for accepting remote copy updates and writing them to a volume, according to an example embodiment of the present invention.

FIG. 14 shows a flowchart of a process for accepting remote copy updates and writing them to a volume, according to an example embodiment of the present invention. The processor 1210 chooses a record from the cache 1220 (1401). The processor 1210 then determines if the data has been already converted based on whether the address of the block is located before or after the conversion pointer 1208 (1402). If the block is located at or before the conversion pointer 1208, the data is encrypted with cryptographic method 5 and the encrypted data is written in the disk 1204 (1403). If the block is located after the conversion pointer 1208, the data is encrypted with cryptographic method 4 and the encrypted data is then written in the disk 1204 (1404).

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for remote copy of encrypted data comprising: a primary storage system device, the primary storage system including a controller, the controller receiving data, encrypting the data with a first cryptographic method, and storing the encrypted data in a volume at the primary storage system; and a secondary storage system, the secondary storage system operatively connected to the primary storage system and including a second volume for receiving and storing a remote copy of the encrypted data, wherein when a block of the stored encrypted data is converted using a second cryptographic method, the converted block and a pointer containing an address at which the conversion has finished is transferred to the second storage system and stored, the pointer being incremented for each block converted before being transferred, a backup copy of the first cryptographic method and the second cryptographic method being stored at a backup system remote from the primary storage system, and wherein if the primary system fails, the backup system can decrypt the data using one of the first cryptographic method or the second cryptographic method based on the pointer, wherein after the conversion of the block is completed, the controller stores the converted block, an ID of the primary storage system, an ID of the volume, an ID of the secondary storage system, an ID of the second volume, the pointer, and a sequence number of the block.

2. The system according to claim 1, wherein the backup system comprises a key backup system operatively connected to the primary storage system.

3. The system according to claim 1, wherein the backup system comprises the secondary storage system, wherein if the primary system fails, the secondary storage system can decrypt the data using one of the first cryptographic method or the second cryptographic method based on the pointer.

4. The system according to claim 1, further comprising at least one memory, the at least one memory having areas for at least one of a remote copy cache, storing the first cryptographic method, storing the second cryptographic method, and storing the pointer.

5. The system according to claim 1, the processor initializing and storing a conversion pointer file at the primary storage system.

6. The system according to claim 1, further comprising a host device operatively connected to the primary storage system, the host device sending I/O requests including the data to the primary storage system.

7. The system according to claim 1, the secondary system further comprising a controller, the controller managing the storing the encrypted data, the converted data, and a conversion pointer file at the secondary storage system.

8. The system according to claim 1, the storing being to a remote copy cache at the primary storage system.

* * * * *